United States Patent [19]

Coutts

[11] 4,366,850
[45] Jan. 4, 1983

[54] CABLE-TYPE TIRE CHAINS AND CROSS MEMBER AND TRACTION SLEEVE THEREFOR

[75] Inventor: James W. Coutts, Swanton, Vt.

[73] Assignee: Burns Bros., Inc., Portland, Oreg.

[21] Appl. No.: 246,363

[22] Filed: Mar. 23, 1981

[51] Int. Cl.³ .............................................. B60C 27/06
[52] U.S. Cl. .................................. 152/222; 24/116 R; 24/299; 29/437; 59/79 A; 152/239; 152/240; 152/242; 152/243; 403/353
[58] Field of Search ............... 152/208, 221, 222, 243, 152/244, 242; 24/68 CT, 68 TT, 119 A, 116 R, 116 A, 221 A, 299; 29/437; 59/93, 95, 79 A; 403/254, 353

[56] References Cited

U.S. PATENT DOCUMENTS

| | | | |
|---|---|---|---|
| 1,242,238 | 10/1917 | Proulx | 152/208 |
| 1,292,526 | 1/1919 | Silberman | 152/233 |
| 1,521,619 | 1/1925 | Haas | 24/116 A |
| 1,533,679 | 4/1925 | Webster | 152/208 |
| 1,644,077 | 10/1927 | Nesbitt | 152/222 |
| 2,125,705 | 8/1938 | Woodworth | 152/213 A |
| 2,178,041 | 10/1939 | Hodell | 152/239 |
| 2,346,477 | 4/1944 | Ederer | 152/221 |
| 2,415,583 | 2/1947 | Eddy | 152/242 |
| 2,514,243 | 7/1950 | Iandiorio | 152/222 |
| 2,714,914 | 8/1955 | Champigny | 152/222 |
| 2,866,491 | 12/1958 | Kell | 152/230 |
| 2,955,634 | 10/1960 | Schieber et al. | 152/233 |
| 3,025,901 | 3/1962 | Bengert | 152/239 |
| 3,190,337 | 6/1965 | Williamson | 152/233 |
| 4,054,304 | 1/1977 | Sirois | 152/222 X |
| 4,155,389 | 5/1979 | Dwinell | 152/221 |
| 4,222,425 | 9/1980 | Bindel | 152/234 |
| 4,263,954 | 4/1981 | Dwinell | 152/243 X |

Primary Examiner—Edward C. Kimlin
Assistant Examiner—Thomas Bokan
Attorney, Agent, or Firm—Shapiro and Shapiro

[57] ABSTRACT

A cable-type tire chain comprises side members adapted to extend circumferentially around opposite side walls of a tire and cross members connected between the side members so as to extend over and across the tire tread. The cross members comprise cables connected to the side members in a manner permitting rotation of the cross members about their longitudinal axes. The cross member cables have sheaths of helically wound wire which are free to rotate on the cables, and traction sleeves are freely rotatable on the wire sheaths. The traction sleeves have cylindrical body portions and outwardly flared end portions. Notches in the end portions of the sleeves define sharp corners at the ends of the sleeves for biting into ice and the like.

18 Claims, 6 Drawing Figures

CABLE-TYPE TIRE CHAINS AND CROSS MEMBER AND TRACTION SLEEVE THEREFOR

BACKGROUND OF THE INVENTION

The invention relates to cable-type chains for use on vehicle tires, for improving traction, for example, in ice or snow conditions. In particular, the invention is concerned with cable-type chains which include a pair of elongate flexible side members adapted to extend circumferentially around opposite side walls of a tire, and cross members provided with traction means such as traction sleeves, the cross members being connected between the side members so as to extend over and across the tire tread. Chains of this general type are well known; see, for example, U.S. Pat. No. 4,155,389.

It is desirable in the design of cable-type tire chains, to maximize traction, vehicle stability and chain life, consistent with minimizing wear both of the tire and of the chain itself. The present invention is directed, inter alia, toward aspects of cable-type tire chain design adapted to provide the tire chain with favorable characteristics in the above or other respects.

SUMMARY OF THE INVENTION

In one of its aspects, the invention provides a novel type of traction sleeve for use on a cable-type tire chain, the sleeve comprising a body portion in the form of a right cylinder, and at least one end portion flared outwardly from the body portion, the end portion defining a notch providing sharp corners on one end of the sleeve. Preferably, both end portions of the sleeve are flared and notched as indicated, and conveniently, the sleeve may be formed by bending an initially flat metal strip into tubular form in a suitable die or the like.

In another of its aspects, the invention provides a cross member for a cable-type tire chain, the cross member being provided with traction means, preferably traction sleeves, and having at its opposite ends attachment means for connecting the cross member to side members of the chain, wherein the cross member comprises a cable covered over at least a part of its length with a sheath of wire wound helically around the cable, and with the sheath being free to rotate on the cable. Preferably the cross member construction is such as to provide elongate sheaths at least at opposite end portions of the cross member, with traction sleeves freely rotatably mounted on the end portions over the wire sheaths.

In still another of its aspects, the invention provides a cross member for a cable-type tire chain, the cross member being provided with traction means and having at its opposite ends attachment means for connecting the cross member to side members of the chain, the attachment means including, in each case, a connector element fixed to the end of the cross member, the connector element having a head with a curved outer surface (conveniently, the head may be part-spherical), the head being adapted to be rotatably received in a complementary connector element attached to one of the side cables, in a manner permitting rotation of the cross member about its longitudinal axis.

Additional features and advantages of the invention will be apparent from the ensuing description and claims taken in conjunction with the accompanying drawings.

DESCRIPTION OF PREFERRED EMBODIMENT

Figure 1:
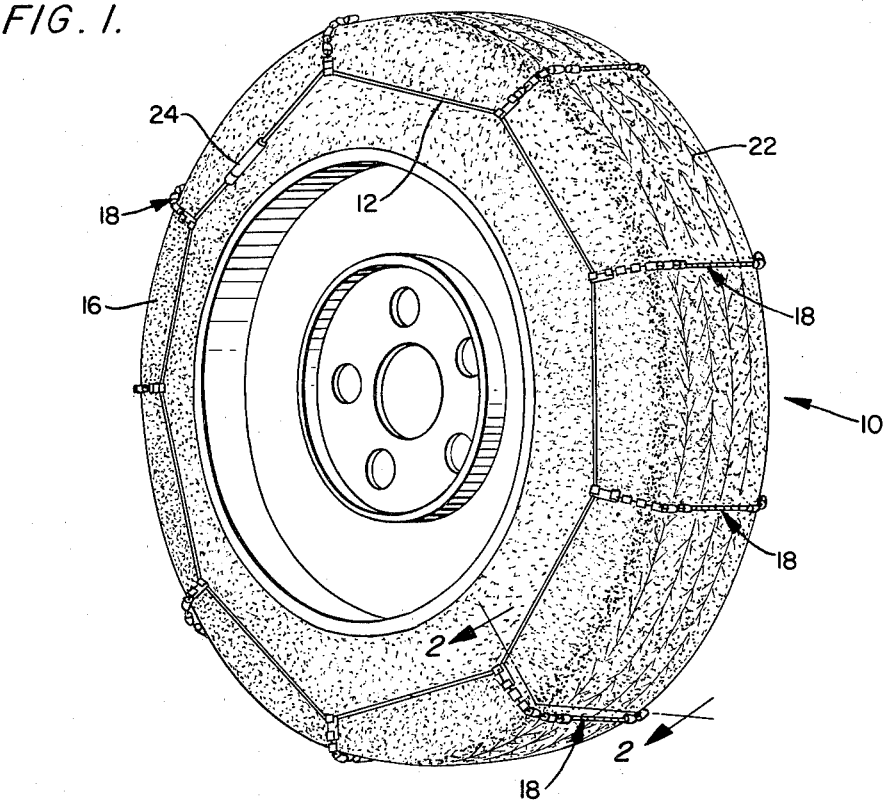
FIG. 1 is a perspective view of a vehicle tire equipped with a tire chain constructed in accordance with the invention.
Figure 2:
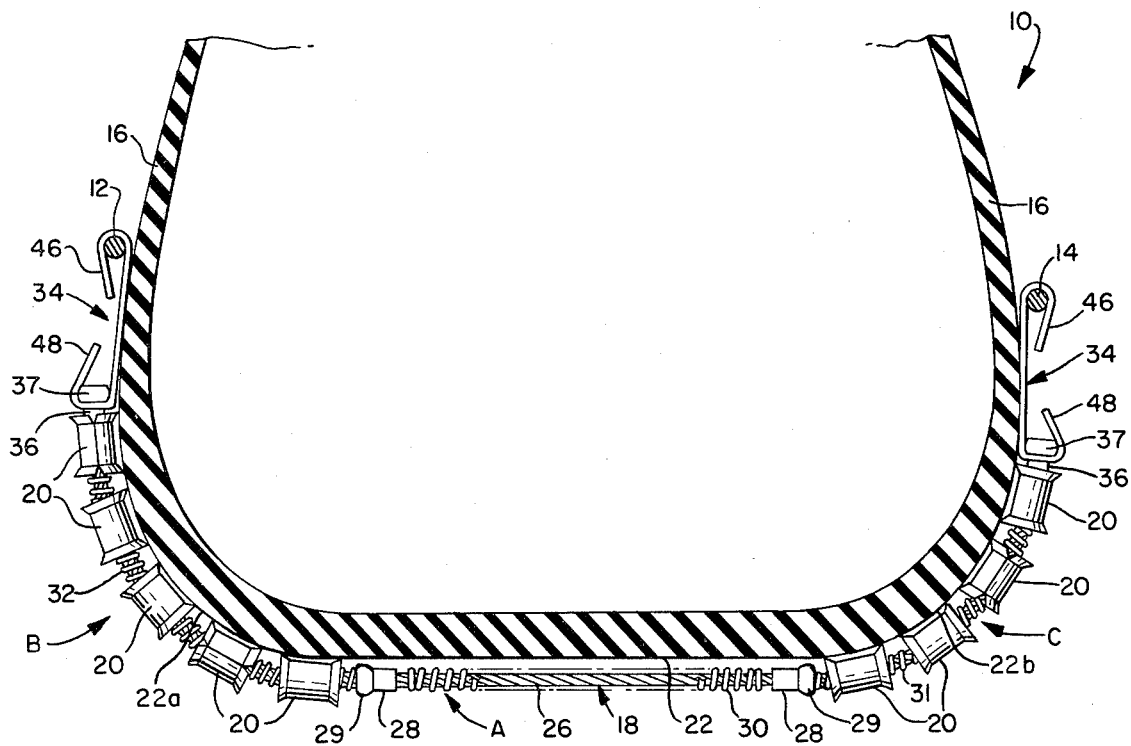
FIG. 2 is an enlarged sectional view on line 2—2 of FIG. 1.

As shown in FIGS. 1 and 2, a vehicle tire 10 is provided with a cable-type tire chain comprising elongate flexible side members 12 and 14 (only one side member 12 is visible in FIG. 1), which extend circumferentially around opposite side walls 16 of the tire, and cross members 18, carrying traction means in the form of traction sleeves 20, the cross members being connected between the side members and extending over and across the tire tread 22. The opposite ends of the respective side members 12 and 14 may be connected together, in known manner, by any suitable connector 24 (FIG. 1), so that the cable chain securely embraces the tire. Side members 12 and 14 may, for example, comprise stranded metal cable or other suitable elongate flexible material.

Figure 3:
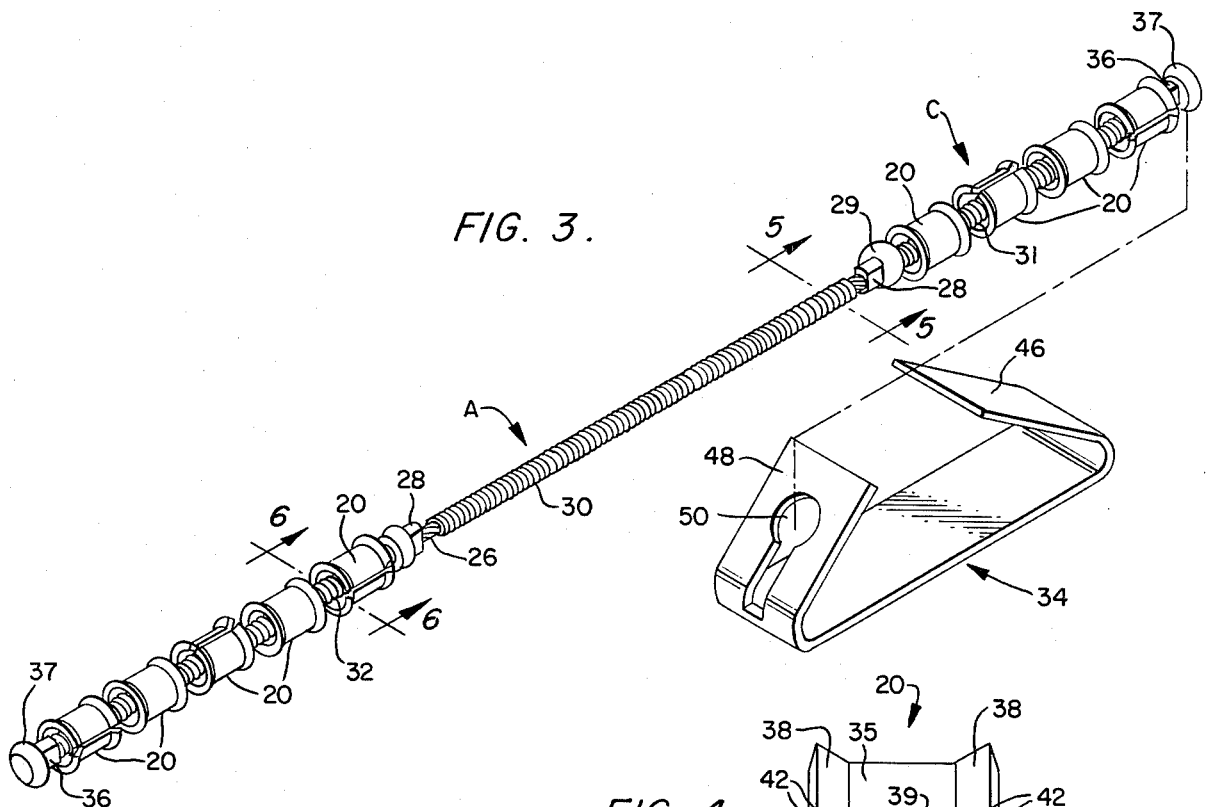
FIG. 3 is an exploded perspective view of parts of the tire chain shown in FIG. 1, including a cross member and a connector element.

Each of the cross members 18, see particularly FIGS. 2 and 3, comprises a length of cable 26 (such as stranded-metal aircraft cable) divided, by bushings 28 crimped to the cable, into a central section A and outer sections B and C. A wire is helically wound around central section A so as to provide an elongate sheath 30 extending substantially the entire length of the central section. The diameter of the sheath is such that it can rotate freely on the cable 26. Outer sections B and C are likewise provided with freely rotatably helically wound elongate wire sheaths 32 and 31. Each end of the cross member has a connector element in the form of a further crimped-on bushing 36 with a part-spherical head 37. Each of the cable sections B and C carries a number of the traction sleeves 20, over the respective sheaths 32 and 31, the diameter of the sleeves 20 and the number of sleeves being such that they are freely rotatable.

Figure 4:
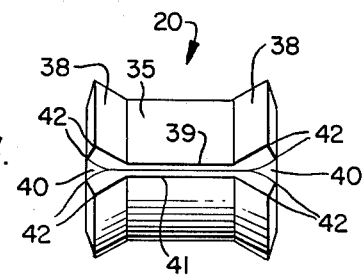
FIG. 4 is a side elevational view of a traction sleeve.
Figure 5:
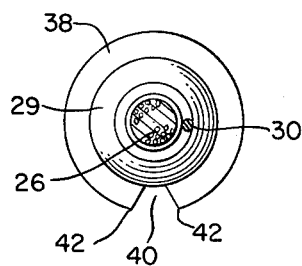
FIG. 5 is an enlarged sectional view on line 5—5 of FIG. 3.
Figure 6:
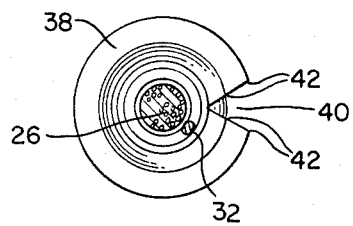
FIG. 6 is an enlarged sectional view on line 6—6 of FIG. 3.

The traction sleeves (see FIG. 4) each have a body portion 35 in the form of a right cylinder and outwardly flared end portions 38. The end portions define V-shaped notches 40 providing sharp corners 42 at the opposite ends of the sleeve for biting into ice, snow or the like. Bushings 28 have part-spherical heads 29, which may be received in the flared ends of the innermost sleeves and provide bearing surfaces which facilitate sleeve rotation. Conveniently, the sleeves may each be formed by bending (in a suitable die or the like) an initially flat strip of metal into tubular form with flared end portions and so that opposite edges 39, 41 of the strip are juxtaposed in the body portion of the sleeve in parallel to the sleeve axis. With this procedure, the flaring of the end portions in itself may form the V-shaped notches 40, which are defined between the end sections of edges 39 and 41.

It will be noted that the lengths of sections A, B and C of the cross members are such that when the tire chain is fitted to a tire, the traction sleeves are located in the vicinity of the tread shoulders 22a, and 22b, with the center of the tire tread being free of sleeves. This is preferred, but not essential, and, the sleeves could be continued across the entire tread. (In this case, bushings 28 could be omitted and a single wire sheath could be used for the entire length of each cross member.) Further, while in the illustrated embodiment, there are unequal numbers of traction sleeves on the respective end portions of the cross member, the actual number of sleeves used in practice may be varied to suit different applications.

The ends of the cross members 18 are connected to the side members 12 and 14 by attachment means including the bushings 36 and complementary connector elements 34 shown particularly in FIGS. 2 and 3. Each connector element 34 is formed from a flat metal plate having one end 46 bent to form a tab by which the element 34 is crimped firmly to the relevant side member. The other end of the element 34 is bent to form a further tab 48 having a keyhole-like opening 50, adapted to receive, through its large end, the head 37 of one of the end bushings 36 of the cross member when tab 48 is lifted away from the body of the element. The bushing 36 can then be moved down opening 50 toward the end of element 34. When tab 48 is then flattened toward the body of the plate, head 37 becomes trapped in element 34 as shown in FIG. 2, the narrow part of opening 50 being of insufficient width to permit withdrawal of head 37, and the flattening of tab 48 preventing head 37 from moving toward the large end of opening 50. The connector configuration, however, due inter alia to the part-spherical head 37, permits rotation of the cross member about its longitudinal axis. The cross member can be released by bending tab 48 to the position of FIG. 3 (with the aid of a tool) and removing head 37 through the large end of opening 50.

The ability of the cross member cables 26 to rotate relative to the connector elements 34, along with the free rotational mounting of the wire sheaths 30–32 and of the traction sleeves, contributes significantly to reducing or at least equalizing wear on the cable chain. Additionally, the specific design of the traction sleeves imparts good lateral traction to a tire, while resisting clogging by ice chips or the like. Further, the connector elements provide a rather low-profile connection between the cross members and the side members which is useful in vehicle wheel wells having limited clearance, and the connections may also permit a degree of lateral hinging as between the side members and the ends of the cross members useful in accommodating changes in tire profile.

While only a single preferred embodiment of the invention has been described herein in detail, the invention is not limited thereby and modifications can be made within the scope of the attached claims.

I claim:

1. A traction sleeve for use in a tire chain, the sleeve comprising a body portion having an outer surface in the form of a right cylinder and at least one end portion having an outer surface flared outwardly from the outer surface of the body portion, the end portion defining a notch providing sharp corners on one end of the sleeve.

2. A sleeve as defined in claim 1, wherein the opposite end portion of the sleeve is also flared outwardly from the outer surface of the body portion and provided with a notch defining sharp corners on the opposite end of the sleeve.

3. A sleeve as defined in claim 1, formed from a strip of metal bent into tubular form, opposite edges of the strip being juxtaposed in said body portion of the sleeve in parallel to the sleeve axis, and end sections of said edges defining the notch in the flared end portion of the sleeve.

4. A cross member for a cable-type tire chain, the cross member being provided with traction means and having at its opposite ends attachment means for connecting the cross member to respective side members of the cable chain, wherein the cross member comprises a cable covered over at least a part of its length with a sheath comprising a wire wound helically around the cable, with the sheath being free to rotate on the cable, and the traction means comprise traction sleeves freely rotatable on said sheath.

5. A cross member as defined in claim 4, wherein the cable is a stranded metal cable.

6. A cross member as defined in claim 4, wherein the sheath covers one end portion of the cable and the cross member includes a like sheath covering the other end portion of the cable, traction sleeves freely rotatable on said sheaths, and a central portion free of traction sleeves.

7. A cross member as defined in claim 6, wherein said portions of the cable are separated by bushings fixed on the cable, said bushings each having a head with a curved outer surface providing a bearing surface for one of the traction sleeves.

8. A cross member for a cable-type tire chain, the cross member being a cable provided with traction sleeves and having at its opposite ends attachment means for connecting the cross member to side members of the cable chain, the attachment means including, in each case, a connector element fixed to the end of the cross member and having a head defining a curved outer surface adapted to be received in a complementary connector element attached to one of the side members in a manner permitting rotation of the cross member about its longitudinal axis.

9. A cross member as defined in claim 8, wherein each complementary connector element comprises a plate having means at one end for fixing the plate firmly to the side member and a bent-over tab at the other end having an opening through which the head is inserted, the tab being flattened toward the body of said plate and trapping the head in the connector.

10. A cross member as defined in claim 9, wherein the means for fixing the plate to the side member comprises a further tab for crimping the plate to the side member.

11. A cable-type tire chain comprising elongate flexible side members adapted to extend circumferentially around opposite side walls of a tire and elongate flexible cross members connected between the side members and being adapted to extend over and across the tire tread, the tire chain including attachment means between the cross members and the side members permitting the cross members to rotate about their longitudinal axes, the cross members comprising cables provided with traction sleeves.

12. A tire chain as defined in claim 11, wherein the attachment means each comprises a connector element with a head defining a curved outer surface fixed to one end of a cross member, and a complementary connector element fixed to a side member, and retaining the head in a manner permitting relative rotation of the connector elements.

13. A tire chain as defined in claim 12, wherein the complementary connector elements each comprise a plate having a bent-over tab with an opening receiving the respective head, the tab trapping the head and being flattened toward the body of the plate.

14. A tire chain as defined in claim 11, wherein the cross members comprise cables and each cable is provided at least over a part of its length with a freely rotatable sheath of wire wound helically around the cable and further wherein the traction means comprises traction sleeves freely rotatably mounted on the sheath.

15. A tire chain as defined in claim 14, wherein the traction sleeves each comprise a body portion in the form of a right cylinder and at least one end portion which flares outwardly from the body portion and includes a notch defining sharp corners on one end of the sleeve.

16. A cable-type tire chain having a pair of elongate side members, cross members connected between the side members, the cross members being cables provided with traction sleeves, and attachment means between the ends of the cross members and the respective side members, each attachment means comprising complementary connector elements secured to a cross member and side member respectively, one of said elements having a head and the other element comprising a plate with a bent-over tab and an opening through which the head is inserted, the head being trapped between the tab and the body of the plate with the tab being flattened toward the body of the plate.

17. A tire chain as defined in claim 16, wherein the head has a curved outer surface to permit rotation of the cross member about its longitudinal axis when the head is trapped in said other element.

18. In a cable-type tire chain having a pair of elongate side members and a cross member connected between the side members, the cross member being a cable provided with traction sleeves, attachment means between the cross member and one of the side members, the attachment means comprising complementary connector elements secured to the cross member and side member respectively, one of said elements having a head and the other element comprising a plate with a bent-over tab having an opening through which the head is inserted, the head being trapped between the tab and the body of the plate with the tab being flattened toward the body of the plate.

* * * * *